July 25, 1939.  A. G. HILLMAN  2,167,453

OPTICAL SYSTEM FOR COLOR PHOTOGRAPHY OR CINEMATOGRAPHY

Filed Jan. 19, 1938  3 Sheets-Sheet 1

INVENTOR
Albert George Hillman
BY
Albert F. Nathan
ATTORNEY

July 25, 1939.  A. G. HILLMAN  2,167,453
OPTICAL SYSTEM FOR COLOR PHOTOGRAPHY OR CINEMATOGRAPHY
Filed Jan. 19, 1938  3 Sheets-Sheet 2
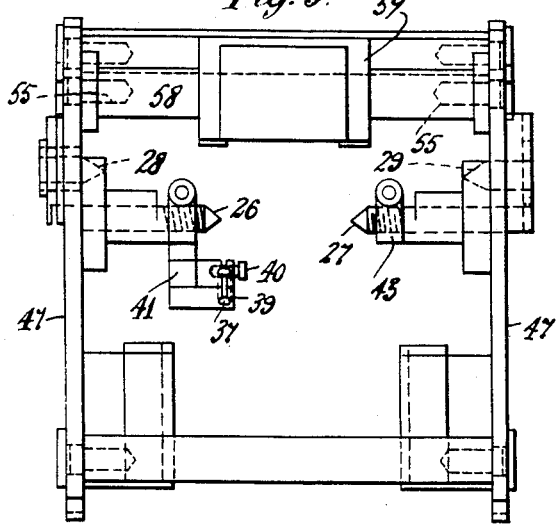
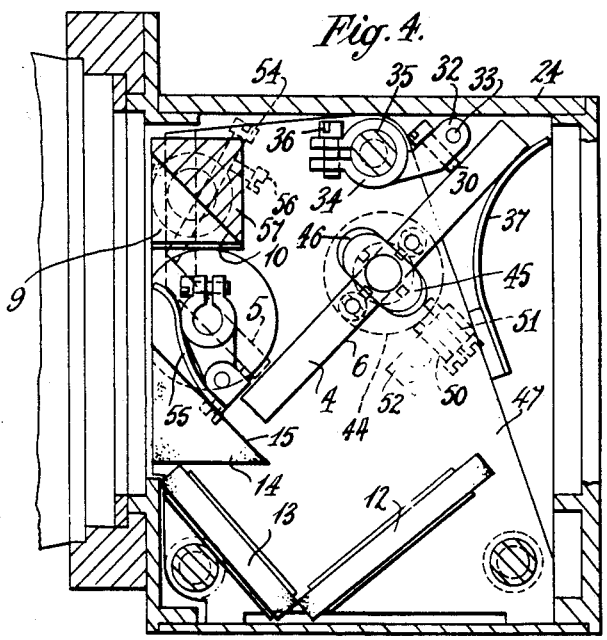
INVENTOR
Albert George Hillman
BY
Albert F. Nathan
ATTORNEY.

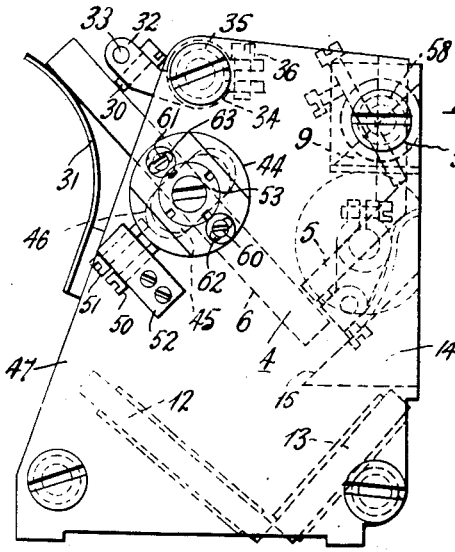

Patented July 25, 1939

2,167,453

UNITED STATES PATENT OFFICE 2,167,453

OPTICAL SYSTEM FOR COLOR PHOTOGRAPHY OR CINEMATOGRAPHY

Albert George Hillman, Amersham, England

Application January 19, 1938, Serial No. 185,744
In Great Britain January 22, 1937

9 Claims. (Cl. 88—1)

The present invention relates to optical systems for three color photography or for cinematography for the production of negative bands of color constituent images which are suitable for producing corresponding positive constituents which may be projected on the screen and so give pictures in substantially natural colors.

The invention deals with that type of optical system in which a main beam is divided into branch beams which each pass through an objective to produce three images in the same plane from substantially the same point (aspect) of view.

One of the objects of the invention is to provide a system which will be sutiable for use with lenses of short focal length involving a wide angle of view such as permit the good photographing of objects near to the camera, such lenses being commonly used in modern cinematography. Difficulties have been experienced in constructing such a system without causing the obstruction, by parts of the branch-beam directing means and/or their housings, of the main beam entering the camera.

According to one feature of the present invention, a pair of plane partially transmitting and partially reflecting mirrors are situated in front of the middle objective of a row of three and are arranged one behind the other in intersecting planes, the rear mirror being arranged to reflect part of the main beam of light by way of another reflecting surface through one of the outside objectives, and the front mirror, which is of substantially greater reflecting area than the rear mirror, is arranged to reflect another part of the main beam onto a reflecting surface which is displaced outwardly with respect to the axis of the other outside objective so as not to obstruct the main beam entering the system, reflecting means being included for re-directing such branch beam back to the axis of such outside objective for transmission therethrough.

This system permits of the use of objectives of short focal length, as a beam of wide angle and wide aperture can be received by the large front mirror and reflected to form one of the outside images without that interference with the main beam which would result from causing the light reflected from the front mirror to pass directly to a reflecting surface situated on the axis of the corresponding objective. It also enables images to be provided of the standard size and spacing on a standard size cinematographic film.

The type of optical system hereinabove referred to can generally be divided into forms in which plane reflectors are used and forms consisting of masses of glass, including prismatic elements. The first mentioned forms have the advantage that refraction troubles are avoided or greatly minimised but they are open to the objection that the paths of the component beams to the focal plane are so considerably different in length that when the images are produced on a length of cinematographic film for subsequent magnification and super-position on the screen there is a danger that the resulting difference in size of the images to be superposed will become apparent and prevent good reproduction.

Accordingly, whilst in the simplest ways of carrying out the invention plane mirrors may be used wholly or partly for directing the light reflected from the front or rear mirrors through the outside objectives, another feature of the invention consists in so constructing the system as at least partially to compensate for the greater length of the two outside paths by the introduction therein of glass elements which have the effect of shortening the beams along such paths, whilst plane partially transmitting reflectors only are interposed in the shortest path in order not substantially to shorten the beam following such path. The shorter such direct path is in comparison with the outside paths, the greater the quantity of glass which is necessary in such latter paths, hence the introduction of pieces of glass in the direct path is to be avoided.

According to this feature of the invention therefore, the shortest beam, i. e., the one which suffers no reflection and passes through the centre of the system, is transmitted through partially-transmitting and partially reflecting mirrors and the other branch beams are passed through glass prisms and/or correcting blocks to the outside or upper and lower objectives.

Provided the apertures are appropriately proportioned, perforated metallic mirrors may be used, but I have found it convenient to use two glass mirrors aluminised, e. g., by the cathode sputtering method, to provide front surface reflecting areas whilst enabling the mirrors partially to transmit light reaching them, these glass mirrors, if kept as thin as is consistent with preserving optical flatness, having little effect on shortening the path through the centre of the system.

The foregoing methods permit of the main adjustments of the system for correct spacing of the pictures and orientation of the pictures on the film being effected by the mirrors.

According to one preferred form of the invention, a right-angled prism is inserted between the rear reflector and an objective for reflecting the light reflected from the rear reflector by a single reflection through such objective and to compensate in part for the path being longer than that taken by the light passing unreflected through the system, whilst the light reflected from the front mirror is reflected by a prismatic device containing three totally reflecting surfaces. Alternatively a single reflecting surface may be interposed between the front mirror and the corresponding objective, this reflecting surface being formed by a prism which is so shaped that alone, or with the aid of one or more ordinary glass blocks, it re-directs the component beam back to the optical axis of such objective. Either of these systems will give a satisfactory margin of correction for the elongated path of this component beam. The second form is very advantageous because the lower prism may be of such a character as to give a full or nearly full correction and the prism in the path of the other outside beam may be formed with an extension, or used with a block of glass for giving full or nearly full correction for such path. In constructing a prism device of the former kind with three totally reflecting surfaces, the first two of such surfaces, viz., that one which upon which the light is first incident after reflection from the front mirror and the next reflecting surface in the direction of this component beam to its objective, are so spaced apart where the light is incident upon their outer portions as to prevent or render negligible any tendency to form multiple images by cross reflection between such surfaces.

The mirrors on the main axis of the system may be rotatably mounted to adjust for the spacing of the images along the length of the film and may also be arranged to swing about the pivotal point at one side so that each mirror can be moved for correctly laterally and longitudinally locating the images on the film.

The foregoing method of longitudinally and laterally shifting the reflected images is applicable to various forms of light dividing systems, including systems incorporating only a single light dividing reflector.

In order that the invention may be the more readily understood, reference is hereinafter made to the accompanying drawings in which:

Fig. 3 is a rear elevation of the mounting and adjusting means;

Fig. 4 is a side sectional elevation of a modified form of Fig. 2 and Fig. 5 is an external side elevation of Fig. 4 but with the casing around its light dividing elements removed.

Fig. 6 is a side elevation of another and preferred form of light dividing and directing device according to the invention and Fig. 7 is a view of still another advantageous variant.

Figure 1:
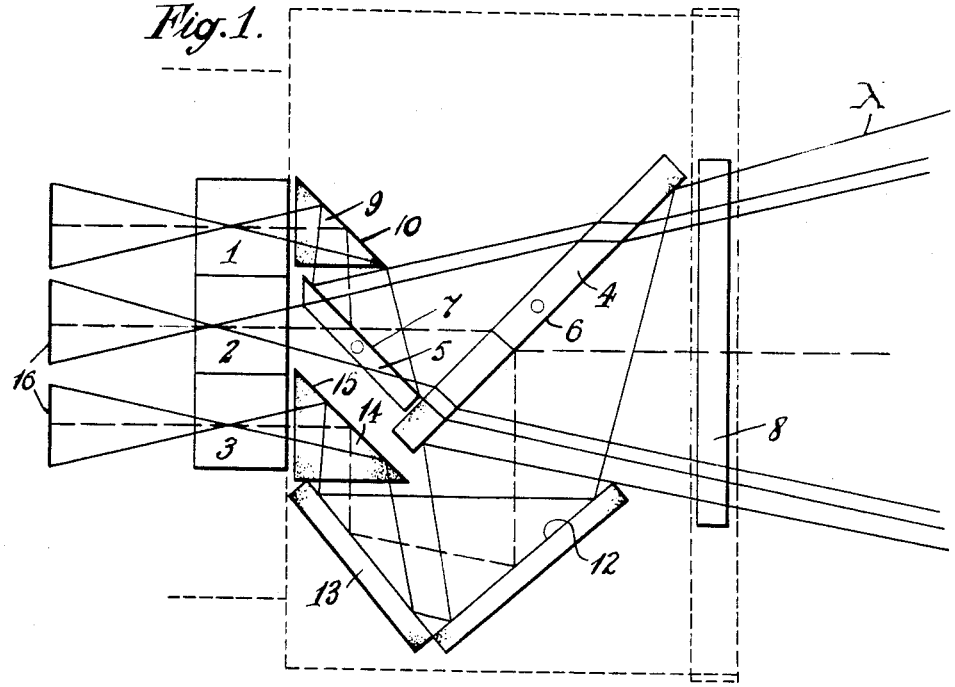
Fig. 1 is a view of one form of light dividing and directing device according to the present invention showing the path of the beams therethrough to the objectives.
Figure 2:
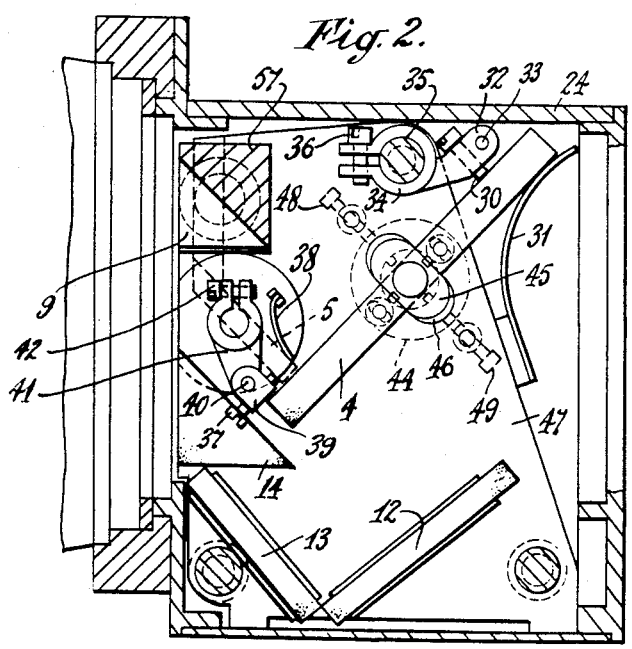
Fig. 2 is a side view showing the mounting and adjusting means for the light dividing and directing elements.

The system comprises three matched objectives 1, 2 and 3, and in front of the middle objective two glass mirrors 4, 5 having reflecting front surfaces 6, 7 formed by aluminising such surfaces by the cathode sputtering method. Some part of the main beam entering the system through the glass window 8 is reflected by the front mirror 4 and the remaining light passes through such mirror. Part of the light so passing reaches the rear mirror where another division of the light takes place, a part of it passing through the central objective and the other part being reflected onto a prism 9 and thence reflected by the totally reflecting surface 10 through the outside objective 1 (hereinafter called the top objective). The prism 9 is a simple right-angled prism partially compensating for the greater length of the path of this component beam with reference to the direct central beam.

The two mirrors 4, 5 are set on the axis of the system in substantially V formation, the front mirror being of larger area than the rear mirror. The front mirror is sufficiently large to extend wholly or partially in front of the top objective and also wholly or partly in front of the bottom objective so as to receive the wide angle entering beam indicated by X.

The light reflected from the front mirror is incident upon a reflecting surface 12, which in Fig. 1 is a plane mirror aluminised on its front face, whence the light of this component beam passes to a second reflector 13 of a similar character and thence by way of a right-angled prism 14 having a totally reflecting surface 15 through the bottom objective to the focal plane 16. The reflectors 12 and 13 are of sufficient area to collect the beam X, and the surface 12 is so displaced from the optical axis of the bottom objective that its upper edge does not obstruct or substantially obstruct the incoming beam X.

It is advantageous that the images taken through the red filter pass through the centre of the system and the images through the branch path of intermediate length are taken through the green filter, as the red and green are considered to be the key images and therefore the fact that the image produced by the beam traversing the longest path is taken through the blue filter will allow for a lesser degree of correction in that path and consequently for a reduction in the amount of glass necessary. This is as applied to full daylight; in half-watt light the reverse applies and it is convenient to rotate the system through 180° so that the beam from the top objective passes through the blue filter, and that from the bottom objective passes through the green filter. The mounting of the system may be, for example, as described in my copending application No. 185,745, filed January 19, 1938.

The prism 14 provides a partial compensation for the longer path of the component beam to the bottom objective.

A greater degree of compensation is however obtained by the preferred form of the invention shown in Fig. 6, in which the two mirrors 12 and 13 are replaced by totally reflecting surfaces 17 and 18 of a prism 19. The lower portions of the surfaces 17 and 18, i. e., where they lie closest together, should be sufficiently spaced where the light is incident thereon to avoid or render negligible cross reflection between such surfaces, as such cross-reflection is liable to form stray images the effects of which are extremely objectionable.

The prism 19 may be secured by an adhesive to the prism 14 or the two prisms may be formed in one piece.

According to the variant system as shown in Fig. 7, the light reflected from the front mirror 4 is received by another reflective surface 20 displaced below the optical axis of the bottom objective so as not to obstruct the entering main beam, the reflecting surface 20 being the surface of a prism 21, the surface 20, and the front mirror 4 being so inclined, and the prism so constructed that the component beam reflected by the front mirror is re-directed back to the axis of the bottom objective without any further reflection of the light after leaving the surface 20. An aluminised reflector 23a may be used to receive the light from the front mirror on the main optical axis before passing it through the prism. The prism in front of the top objective is in Fig. 6 a right-angled prism with its emergent face perpendicular to the main optical axis, but in the form shown by Fig. 7 the block is extended, the prism 21 and the extended block giving a full correction.

The upper face of the prism is not in one plane, but is of a very shallow V formation, so as to make the paths of the outside rays and the central rays of the beam passing through the prism equal. The prisms may be of dense crown glass. The side faces of the prism 21 are made non-reflecting, e. g., by frosting the glass, as also are the surfaces shown by the dot lines in Fig. 7.

In any of the forms hereinabove described, the mirrors or prisms through which the component beam passes to the lower objective may be fitted in a predetermined fixed position in the box 24 by the aid of accurately arranged plane supporting surfaces, e. g., in side channel members or in a supporting cradle, the cradle being supported on a horizontal face so that it can be slid to and fro until, by photographic tests its predetermined position is reached, whereupon it may be screwed or otherwise fixed in such position.

The front and rear reflectors are rotatable about bearing pivots 26, 27, 28, 29 whose pointed ends intrude into appropriately shaped holes in the edges of the mirrors.

These pivots form axes at right angles to the film length so that by rotating the mirrors thereabout, picture pitch, i. e., spacing of the images along the film can be correctly adjusted. The adjustment of the front mirror is conveniently effected by the fine screw 30 acting against a spring 31. The screw 30 is arranged in a split clamp 32 which can be freed to allow of adjustment being effected but can be tightened, following adjustment, by means of a screw 33. The split clamp 32 may be carried by a bracket 34, which is itself split and embraces a cross rod or strut 35, to which it can be tightly clamped by means of the screw 36. The bracket can therefore be slackened and turned to vary the position at which the screw 30 acts against the mirror.

For adjusting the small mirror, a fine screw 37 acting against a spring 38 can be used, the screw being mounted in a split clamp 39 clamped by a screw 40, the clamp being carried by a split bracket 41 which can be clamped by means of a screw 42 around the bearing pivot 26. The split bracket also serves to control the resistance which the screwed extension of the pivot offers to rotation. A similar clamp 43 determines the resistance which the screwed portion of the bearing pivot 37 offers to rotation.

The mirrors are also arranged to be swung about an axis substantially at right-angles to the aforesaid axes of rotation in order to permit lateral adjustment of the images on the film. These movements can be readily achieved by arranging for one of the bearing pivots of each mirror to be moved in a direction substantially at right angles to the plane of the mirror. For this purpose such movable pivot is screwed into a disc 44 having a projection 45 to fit with a stiff sliding fit into a slot 46 in the side frame member 47, and the disc is operated by opposing screws 48, 49. According to the alternative, and preferred form shown in Figs. 4 and 5, the disc is arranged to be slidden by the aid of push and pull screws 50, 51, the push screw 50 engaging a threaded hole in the fixed block 52 and the pull screw passing through a plain hole in such block into a threaded hole in the disc. A lock nut 53 engages the screwed pivot pin and prevents accidental rotation thereon. The disc may be additionally guided by screws 60, 61 fitting into elongated slots 62, 63 in the disc.

The small mirror is adjusted by a long fine-pitched screw 54 which passes through the support for the top prism 9 and rotates the mirror 5 against the resistance of a spring 55. The fine-pitched long screw itself offers considerable resistance to accidental rotation to disturb the setting, but it may be retained by a set screw 56.

The prism 9 may be fixed to a carrier 57 carried by a cross rod 58 which is rotatable in holes in the side members 47, the carrier being engagable by a spanner for rotation and being locked by set screws 55. The prism can therefore be rotated about this axis for the purpose of bringing its emergent face parallel to the film track, this single adjustment of the prism being sufficient, as only a slight range of adjustment is ordinarily necessary, the main adjustments being by means of the reflectors.

The light divider casing is made appropriately light-tight by any suitable or well known means, except for the main and branch beam transmitting apertures.

By the aid of the aforesaid adjustments and with the help of photographic tests a very exact positioning of the images on the film can be attained.

Filters of the kind commercially known as Wratten filters can be used. On the basis of full daylight, the system may be so constructed as to apportion the main beam of light in approximately the following percentages; red 24.3%; green 43.2% and blue 32.4%. For half watt lighting the green and blue images need practically a reversal of the aforesaid light percentages and the red image will need somewhat less light than for full daylight. Consequently the same light-dividing system if made rotatable through 180° as above described may be employed for both full daylight and half-watt light, especially if the blue and green filters are interchangeable with other shades of blue and green and by using a somewhat denser red filter for half-watt light. A suitable form of interchangeable filter that can be adopted is described in my copending application No. 24,613/1936.

It is advantageous to arrange the filters as near to the focal plane as is practicable.

Masks may be used which are of a size corresponding to the picture at the emergent face of the prisms so as to avoid or reduce the risk of stray or ghost images, caused by back or counter reflection within the glass elements, marring the main images.

The window through which the main beam passes protects the system from atmospheric influence and will be of optical glass.

The present system is well suited for taking negatives by the methods described in our copending application Serial Numbers 134,874 and 154,863, but it is applicable to various other methods which require the production of a band of color constituent negatives. For example, the present camera may be used for producing on a single film a series of color selection negatives from which a positive can be produced for projection through appropriate color filters. Or from such a single negative matrice films may be obtained for each of the separate color values, by, for example, using a printer in which the basic film is pulled down three pictures at each pull, and the film to be printed is pulled down one picture at each pull.

It is common practice at the present time to use objectives of a focal length as short as 24 mm. or 35 mm., and in such cases it is practically impossible to arrange any glass pieces behind the objective, but where objectives of longer focal length are employed it is possible by using glass elements behind the outside objectives to obtain a full correction for the different lengths of the paths, or alternatively additional glasses may be used in front of the such objectives to achieve full correction.

What I claim is:

1. An optical system for wide angle photographic or cinematographic cameras comprising two outside objectives and a middle objective, said objectives being of relatively short focal length and relatively closely spaced and arranged to produce three images in the same focal plane, a pair of plane partially transmitting and partially reflecting mirrors situated in front of the middle objective and arranged one behind the other in intersecting planes, a single reflecting surface between said rear mirror and one of said outside objectives, the rear mirror being arranged to reflect part of the main beam of light by way of said reflecting surface through said outside objective, said front mirror being of substantially greater reflecting area than said rear mirror and sufficiently large as to extend substantially entirely over the areas of the said rear mirror and said single reflecting surface and its related objective, another reflecting surface laterally displaced outside of the entrance angle of the system and laterally displaced from the first mirror so as not to obstruct the wide angle beam entering the system and also laterally displaced outwardly with respect to the axis of said second outside objective so that the axis of the beam reflected by said surface is more remote from the axis of the main beam than is the axis of said second objective, and means for redirecting the beam formed by such latter part of the main beam back to the axis of said second outside objective for transmission therethrough.

2. An optical system for wide angle photographic or cinematographic cameras comprising two outside objectives and a middle objective, said objectives being of relatively short focal length and relatively closely spaced and arranged to produce three images in the same focal plane, a pair of plane partially transmitting and partially reflecting mirrors situated in front of the middle objective and arranged one behinde the other in intersecting planes, a prism providing a single reflecting surface between said rear mirror and one of said outside objectives, the rear mirror being arranged to reflect part of the main beam of light by way of said prism through said outside objective and said prism serving to shorten the path of the branch beam of light passing therethrough, said front mirror being of substantially greater reflecting area than said rear mirror and sufficiently large as to extend substantially entirely over the areas of the said rear mirror and said single reflecting surface and its related objective, prismatic means providing another reflecting surface laterally displaced outside of the entrance angle of the system and laterally displaced from the first mirror so as not to obstruct the wide angle beam entering the system and also laterally displaced outwardly with respect to the axis of said second outside objective, said front mirror being arranged to reflect another part of the main beam onto said latter reflecting surface, said second mentioned prismatic means having a shortening effect on the branch beam of light passing therethrough which is greater than the shortening effect of the first mentioned prism so as to compensate at least in part for the longer path of said latter beam and being arranged to redirect said second branch beam back to the axis of said second outside objective for transmission therethrough.

3. The combination set forth in claim 1 in which said redirecting means includes two further reflecting surfaces between said outwardly displaced reflecting surface and said second outside objective, at least certain of the reflecting surfaces between said front mirror and said second outside objective being formed by prismatic means.

4. The combination set forth in claim 1 in which the said laterally displaced reflecting surface and means for redirecting the branch beam back to the axis of the second outside objective comprises a prism having a single reflecting surface between the said front mirror and the second outside objective set at such an angle relative to the plane of the front mirror as to cause the branch beam reflected thereby to be directed back in an inclined path towards the entry face of said second outside objective, said prism having its emergent face arranged to cause said inclined beam to be re-directed into alignment with the axis of the second outside objective.

5. An optical system according to claim 2 in which the reflecting surface between the rear mirror and the first mentioned outside objective is a totally reflecting surface of a prism, the mirrors in front of the middle objective are formed of glass provided with a metallised front reflecting surface and the prism having the outwardly displaced reflecting surface has a greater shortening effect than the prism receiving light from the rear mirror whereby at least partially to correct for the different lengths of the optical paths.

6. An optical light-dividing system according to claim 2, in which the mirrors in front of the middle objective are formed of polished metal perforated to allow part of the light to pass through the mirrors and the reflecting surface between the rear mirror and the first mentioned outside objective is a totally reflecting surface of a prism, and the prism having the outwardly displaced reflecting surface has a greater shortening effect than the prism receiving light from the rear mirror whereby the least partially to correct for the different lengths of the optical paths.

7. The combination set forth in claim 1 in which said laterally displaced reflecting surface and the said means for redirecting the branch beam back to the axis of the said second outside objective are formed by totally reflecting surfaces of prismatic means.

8. An optical system for wide angle photographic or cinematographic cameras, comprising two outside objectives and a middle objective therebetween, said objectives being of relatively short focal length and arranged to produce three images in the same focal plane, a pair of plane partially transmitting and partially reflecting mirrors situated in front of the middle objective and arranged one behind the other in intersecting planes, a right-angled prism providing a single reflecting surface between said rear mirror and one of said outside objectives, the rear mirror being arranged to reflect part of the main beam of light by way of said prism surface through said outside objective, said front mirror being of substantially greater reflecting area than said rear mirror, and sufficiently large as to extend substantially entirely over the areas of the said rear mirror and said single reflecting surface and its related objective, a reflecting surface which is displaced laterally from the first mirror and outwardly with respect to the axis of the other outside objective so as not to obstruct the wide angle main beam entering the system, said front mirror being arranged to reflect another part of the main beam onto said latter reflecting surface, and two further reflecting surfaces arranged between said outwardly displaced surface and said second outside objective for re-directing the beam formed by such latter part of the main beam back to the axis of said second outside objectives for transmission therethrough, at least the outwardly displaced reflecting surface and the reflecting surface next to it in the direction of the travel of the corresponding branch beam being formed by prismatic means, said reflecting surfaces being spaced apart where the light is incident upon their outer portions so as to lessen cross-reflection between such surfaces.

9. An optical system for wide angle photographic or cinematographic cameras, comprising two outside objectives and a middle objective therebetween, said objectives being of relatively short focal length and arranged to produce three images in the same focal plane, a pair of plane partially transmitting and partially reflecting mirrors situated in front of the middle objective and arranged one behind the other in intersecting planes, said mirrors being rotatably mounted about parallel axes at right angles to the axes of said objectives and to the line joining the centres of said objectives, means for rotating said mirrors about these axes for the purpose of adjusting the spacing of the images along a film, an end pivot for each of said mirrors, and means for rotating said mirrors about said end pivots for the purpose of adjusting the images laterally of the film, a single reflecting surface arranged between said rear mirror and one of said outside objectives, the rear mirror being arranged to reflect part of the main beam of light by way of said reflecting surface through said outside objective, said front mirror being of substantially greater reflecting area than said rear mirror and sufficiently large as to extend substantially entirely over the areas of the said rear mirror and said single reflecting surface and its related objective, said reflecting surface being rotatable about an axis perpendicular to the axes of said objective and to the line joining their centres, means for rotating said surface for adjusting the spacing of the images along the film, another reflecting surface which is displaced laterally from the first mirror and outwardly with respect to the optical axis of the second outside objective so as not to obstruct the main beam entering the system, said front mirror being arranged to reflect another part of the main beam onto said latter reflecting surface, and means for re-directing the beam formed by such latter part of the main beam back to the optical axis of said second outside objective for transmission therethrough.

ALBERT GEORGE HILLMAN.